United States Patent [19]

Bergerioux et al.

[11] Patent Number: 4,870,799
[45] Date of Patent: Oct. 3, 1989

[54] INSTALLATION FOR MAKING UP BATCHES OF ARTICLES

[75] Inventors: Jean-Marcel Bergerioux, Chateauneuf Sur Isere; Claude Pavie, Houilles; Christian Plent, Bourg Les Valence; Bernard Constant, Beaumont Les Valence, all of France

[73] Assignee: Societe Anonyme dite: Compagnie Generale D'Automatisme CGA-HBS, Paris, France

[21] Appl. No.: 160,949

[22] Filed: Feb. 26, 1988

[30] Foreign Application Priority Data

Feb. 27, 1987 [FR] France .................. 87 02671

[51] Int. Cl.[4] .................. G07F 7/02; B65B 57/20
[52] U.S. Cl. ............................. 53/55; 53/131; 53/154; 53/168; 53/391; 221/2; 221/71; 221/123
[58] Field of Search ........... 53/52, 55, 77, 168, 53/154, 495, 493, 501, 131, 137, 391, 390; 221/15, 71, 123, 2; 364/478

[56] References Cited

U.S. PATENT DOCUMENTS

| | | | |
|---|---|---|---|
| 3,556,342 | 1/1971 | Guarr | 221/2 |
| 3,878,967 | 4/1975 | Joslin et al. | 221/123 X |
| 3,917,045 | 11/1975 | Williams et al. | 221/71 X |
| 4,428,179 | 1/1984 | Jordan et al. | 53/154 X |
| 4,546,901 | 10/1985 | Buttarazzi | 221/71 X |

FOREIGN PATENT DOCUMENTS

0208029 1/1987 European Pat. Off. .

Primary Examiner—James F. Coan
Attorney, Agent, or Firm—Sughrue, Mion, Zinn, Macpeak & Seas

[57] ABSTRACT

An installation for making up batches of articles, the installation being characterized in that it comprises at least one work station for one operator, said station including a storage member (4) for storing said articles species-by-species, said articles each being provided with automatically readable identification means, said station also including a reader (19) for automatically reading the said identification means and a hatch (17) communicating with a chute (18) whose opening is controllable, said installation further including an endless chain of buckets (21) disposed in such a manner that the buckets pass beneath the chutes, and a moving belt (25) disposed beneath the buckets and receiving the boxes (26) for receiving the batches of articles via an inlet station, each bucket being provided with a controllable pivoting device in order to cause the article contained therein to fall into a box, the installation including a station (20) from which loaded boxes are removed and being controlled by a computer which controls the opening and the closing of the hatches and the chutes and the pivoting of the buckets in accordance with a program which is established depending on the batches to be made up.

8 Claims, 6 Drawing Sheets

INSTALLATION FOR MAKING UP BATCHES OF ARTICLES

BACKGROUND OF THE INVENTION

This invention is advantageously applied to dispensing medicines, in particular in hospitals, for making up batches of medicines with said batches being made up individually for each patient in a given service, for example, in response to a set of prescriptions made out for each of them. The invention is equally applicable to dispensing small articles in retail centers, shops, or stores or in manufacturing workshops for use with articles such as hardware or electronic components in the form of individual batches made up in response to a plurality of orders from a set of customers or production services.

Numerous devices are already known for dispensing goods in response to orders, in particular pharmaceutical products in dispensaries or in central services which supply dispensaries.

Prior devices of this type have been developed to provide large scale storage of goods, together with automated handling capable of bringing together extracted articles in response to each order. These devices can be controlled by an electronic system which is itself controlled from a console or by a computer having a terminal with a keyboard, and also serving to manage stock availability and reprovisioning where necessary.

Thus, French Pat. No. 71 18429 describes a device for storing and dispensing objects, said device having a plurality of vertical drawers each constituted by a row of vertical compartments.

Each compartment contains a stack of identical objects in the form of boxes or the like. The drawers belong to one or more storage modules. Within each module, the drawers are invididually movable in translation in a direction perpendicular to the compartments in order to position one or other of the compartments in a drawer driven in translation over a conveyor belt belonging to the module. A catch carried by the conveyor belt engages the desired object at the bottom of the stack contained in the compartment via a suitable compartment bottom and serves to extract the object. The object drops onto the conveyor belt and is thus conveyed by that belt alone or by other auxiliary belts as well towards a central recovery point while the drawer is returned to its initial position in the module.

Such known devices relate essentially to the organization of the storage assembly and to the means for automatically extracting each desired object. They process the orders received one after the other.

An aim of the present invention is to provide an installation for making up batches of items packaged individually or in boxes containing a plurality of articles, in response to a set of orders, with the method in which articles are extracted being manual or automatic, and thus being easily adaptable to existing ordinary storage systems, while providing a significant improvement in the services rendered together with a gain in productivity.

SUMMARY OF THE INVENTION

The present invention provides an installation for making up batches of articles, the installation being characterized in that it comprises at least one work station for one operator, said station including a storage member for storing said articles species-by-species, said articles each being provided with automatically readable identification means, said station also including a reader for automatically reading the said identification means and a hatch communicating with a chute whose opening is controllable, said installation further including an endless chain of buckets disposed in such a manner that the buckets pass beneath the chutes, and a moving belt disposed beneath the buckets and receiving the boxes for receiving the batches of articles via an inlet station, each bucket being provided with a controllable pivoting device in order to cause the article contained therein to fall into a box, the installation including a station from which loaded boxes are removed and being controlled by a computer which controls the opening and the closing of the hatches and the chutes and the pivoting of the buckets in accordance with a program which is established depending on the batches to be made up.

Advantageously, the installation includes a member for labelling each box after it has received a batch.

Preferably, each work station includes a display screen in communication with the computer in order to display, in particular, instructions for making up batches.

In a particular embodiment, each of the boxes has two compartments, with a selector device being placed between the bucket chain and the belt in order to direct objects to one or other of said compartments.

BRIEF DESCRIPTION OF THE DRAWINGS

An embodiment of the invention is described by way of example with reference to the accompanying drawings, in which.

MORE DETAILED DESCRIPTION

The example chosen for illustrating the invention is an installation for making up batches of articles and comprising three work stations where three operators can work together to make up a single batch. Naturally, the installation can be operated by one or two operators only; it is also possible to design an installation which includes only one or two work stations or else an installation which includes more than three work stations.

Figure 1:
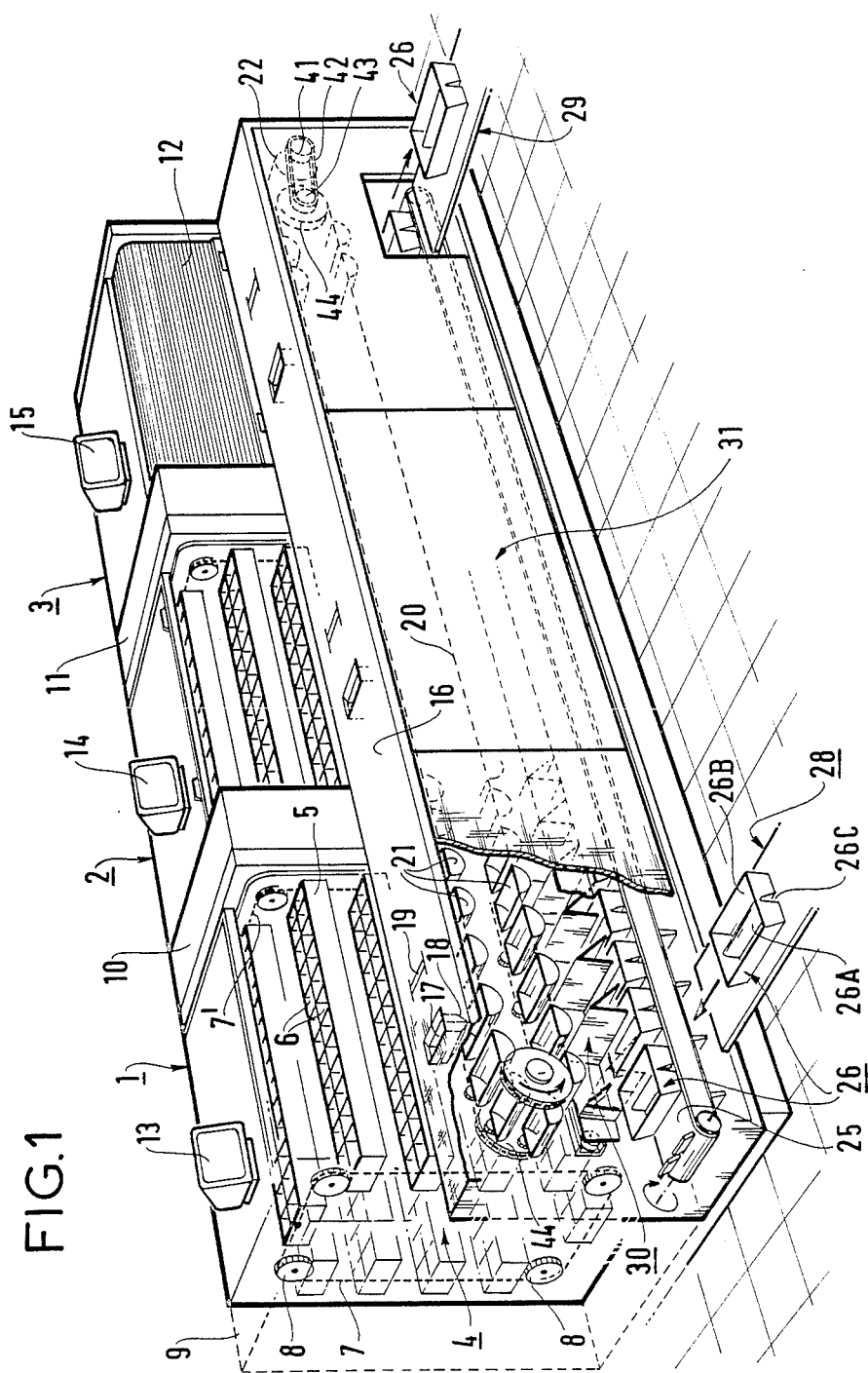
FIG. 1 is a diagrammatic perspective view of an installation in accordance with the invention for making up batches.

Returning to the example shown in FIG. 1, work stations 1, 2, and 3 each include a carousel such as 4 for storing articles. Each carousel comprises a plurality of horizontal troughs 5 each of which includes a plurality of bins 6 with each bin containing articles of a single species. It is assumed that the example described is an installation in a hospital pharmacy and that the articles are medicines. Each of the batches to be made up relates to the medicines required by a patient for a given day, and in the example described these medicines are split into two lots, one for the morning and the other for the afternoon.

The troughs are moved in the horizontal position around a closed path by means of drive chains 7 and 7' and wheels 8. The drive motors (not shown) are disposed inside volumes 9, 10, and 11 adjacent to the respective carousels. Access to the troughs can be closed, after work is completed, by means of a shutter 12.

Each work station includes a display screen (13, 14, 15) enabling the operator to follow a program for making up batches.

The work surface 16 is common to all three work stations and includes, for each station, an opening 17 disposed above a loading chute 18. Each station is also associated with a device 19 for reading the marking provided on each article. This may be an optical bar code reader, for example.

The installation includes an endless chain 20 of buckets 21 which are common to all three work stations. The chain is driven by a motor 22 and runs beneath the chutes so that the buckets 21 pass beneath each of the chutes 18.

An endless moving belt 25 is placed beneath the bucket chain and serves for transporting boxes 26 for receiving batches of articles.

Empty boxes arrive via a loading station 28 at one end of the belt.

Boxes which have received their batches are removed at an unloading station 29 at the other end of the belt.

In the example given, the boxes 26 have two compartments 26A and 26B corresponding to two lots of medicines to be taken during the day.

The bottom of each box has a transverse ridge 26C between the two compartments.

A selector device 30 which is described in greater detail below serves to direct each article into one or other of the above-mentioned compartments.

The front face of the installation is closed by a panel 31.

Figure 2:
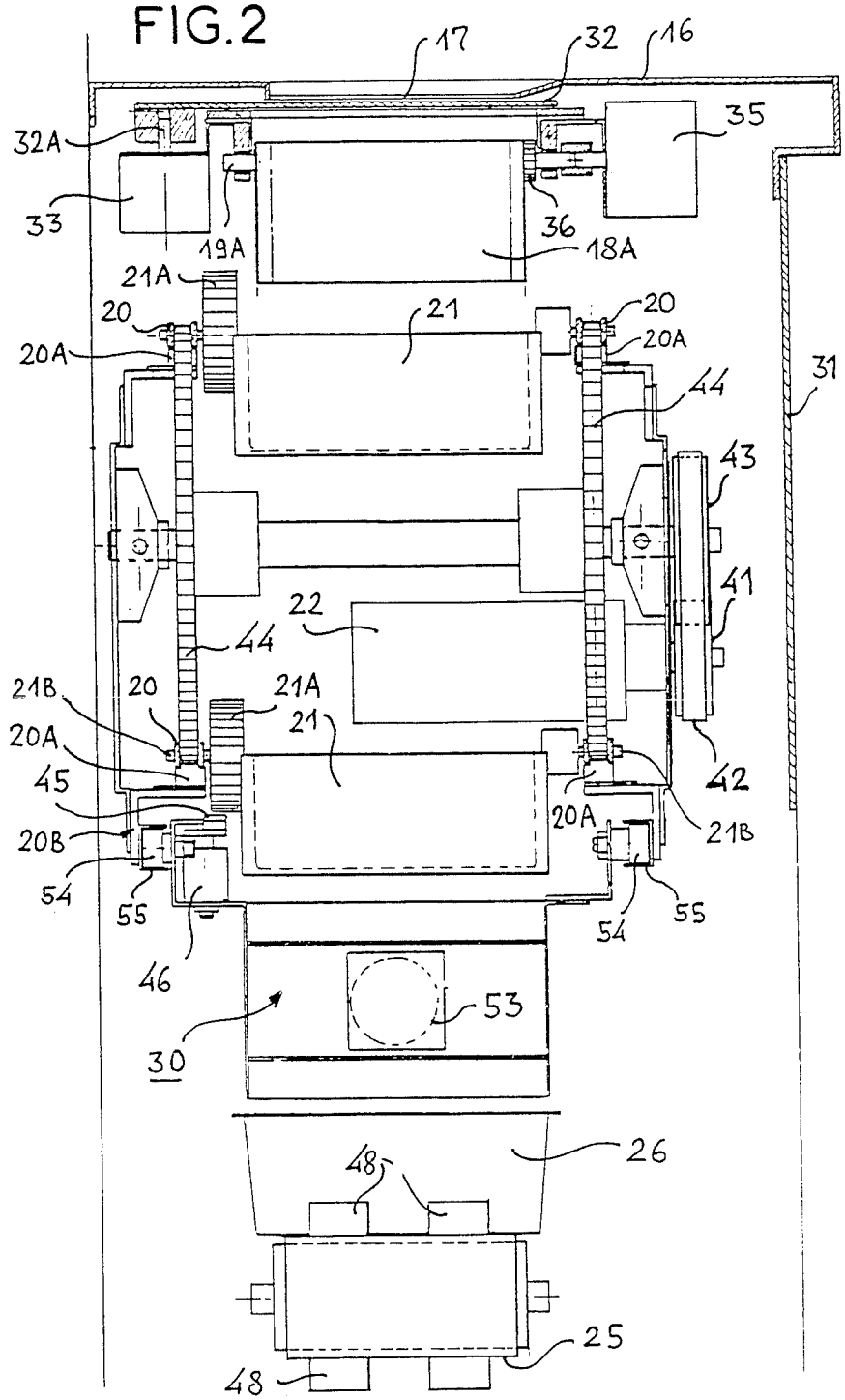
FIG. 2 is a cross-section view through the installation.

FIG. 2 is a cross-section through the installation.

It shows the work surface 16, and an opening 17 through which an operator inserts articles.

Figure 5:
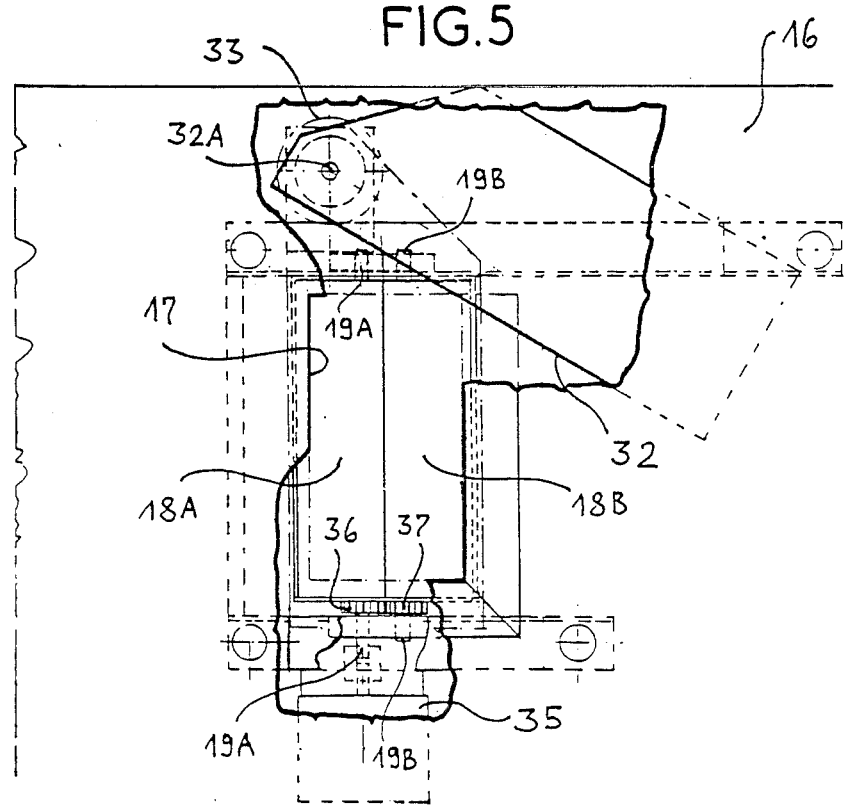
FIG. 5 is a fragmentary plan view of the work surface of the installation.

A flap 32 (see also FIG. 5) is displaceable in its own plane by rotation about an axis 32A under drive from a motor 33 and serves to close the opening 17.

Figure 4:
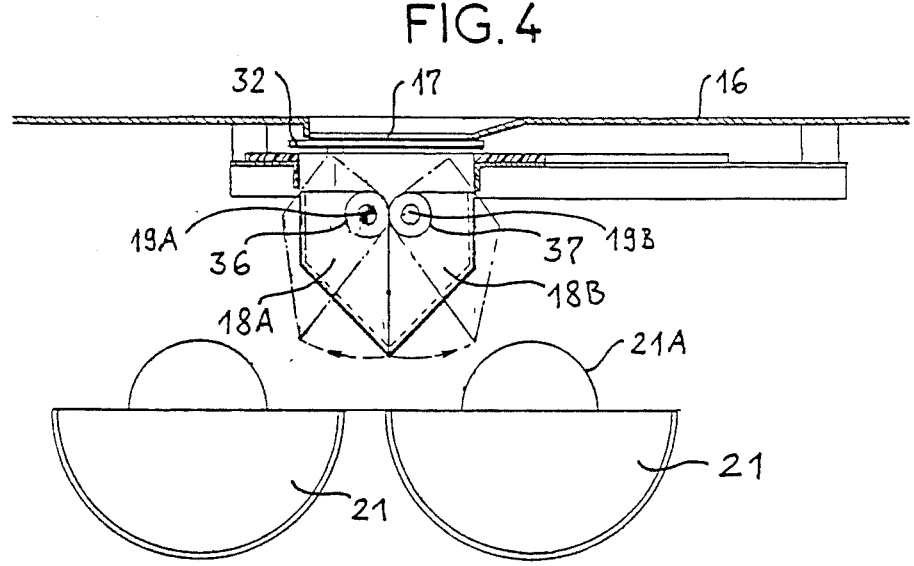
FIG. 4 is an elevation view of a reception chute.

The chute 18 (see also FIG. 4) comprises two half-shells 18A and 18B which are rotatable about respective shafts 19A and 19B under drive from a motor 35 driving a gear wheel 36 fixed to half-shell 18A, with half-shell 18B being driven by a wheel 37 which co-operates with the wheel 36.

The chain 20 of buckets 21 is driven by a motor 22 supported by rails 20A fixed to a frame 20B and driving toothed drive wheels 44 via a gear wheel 41, a chain 42, and a gear wheel 43.

Figure 3:
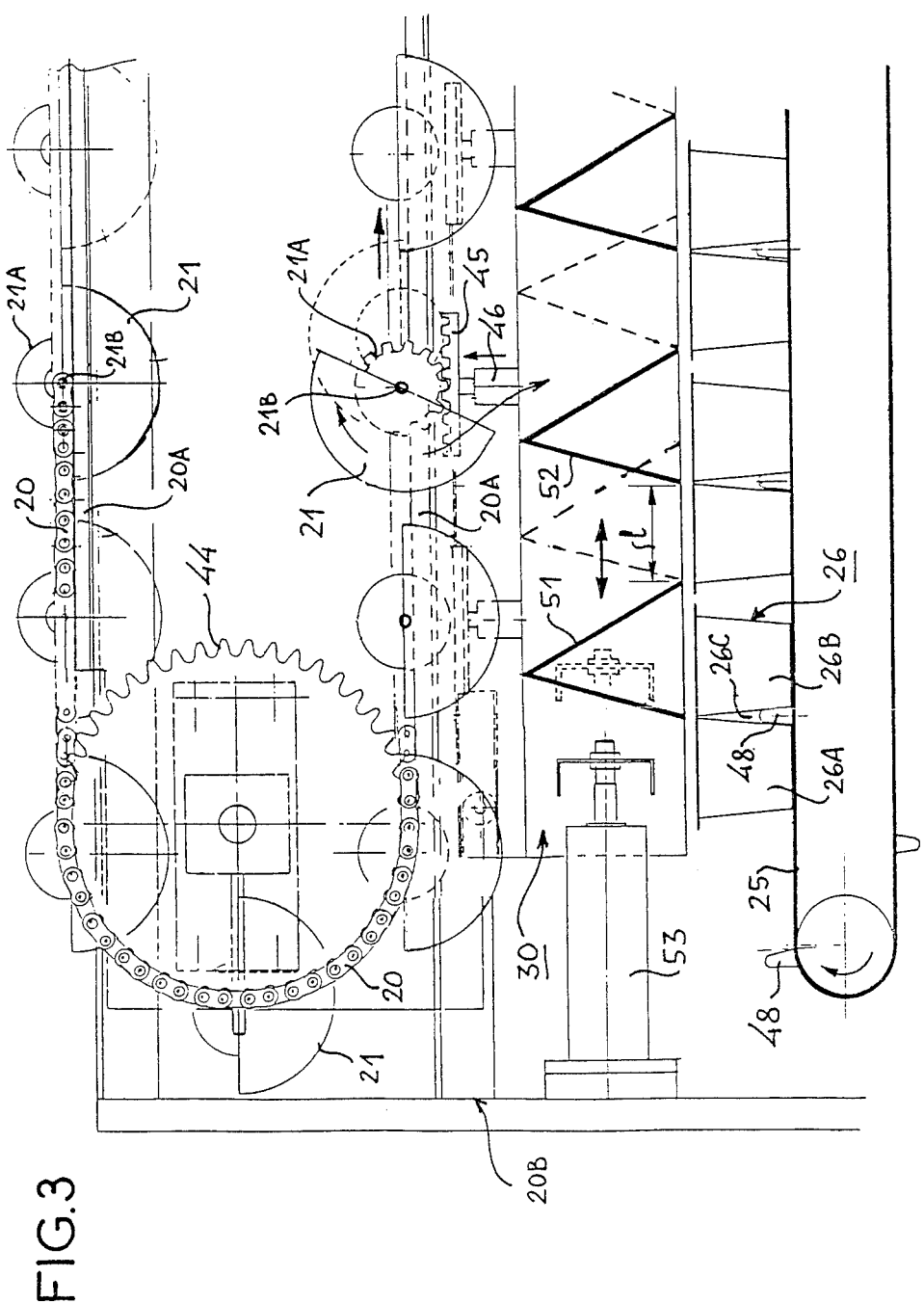
FIG. 3 is a front view of the installation showing the buckets and the distribution hoppers.

Each bucket 21 is provided with a pivoting device. In the example described, each bucket is fixed to a wheel 21A (see also FIG. 3) which is suitable for co-operating with a rack 45 displaceable in translation by means of an electromagnet 46 in order to rotate the bucket so as to cause the article contained in the bucket to fall into one of the boxes 26 situated therebeneath.

The box drive belt 25 has catches 48 which co-operate with the ridges 28C in the boxes. These catches ensure that the boxes do not move relative to the belt and they also ensure that the boxes are at a uniform constant spacing or pitch.

The selector device 30 comprises a plurality of hoppers each constituted by two coverging inclined metal sheets 51 and 52 with the width 1 of the opening from a hopper as measured in the belt displacement direction being equal to the width of a compartment in a box.

The sheet 51 of one hopper is welded to the sheet 52 of the adjacent hopper such that the hopper assembly constitutes an integral assembly displaceable in translation through a step of length 1 under the control of an actuator 53. This assembly is supported by wheels 54 that run on rails 55.

Figure 6:
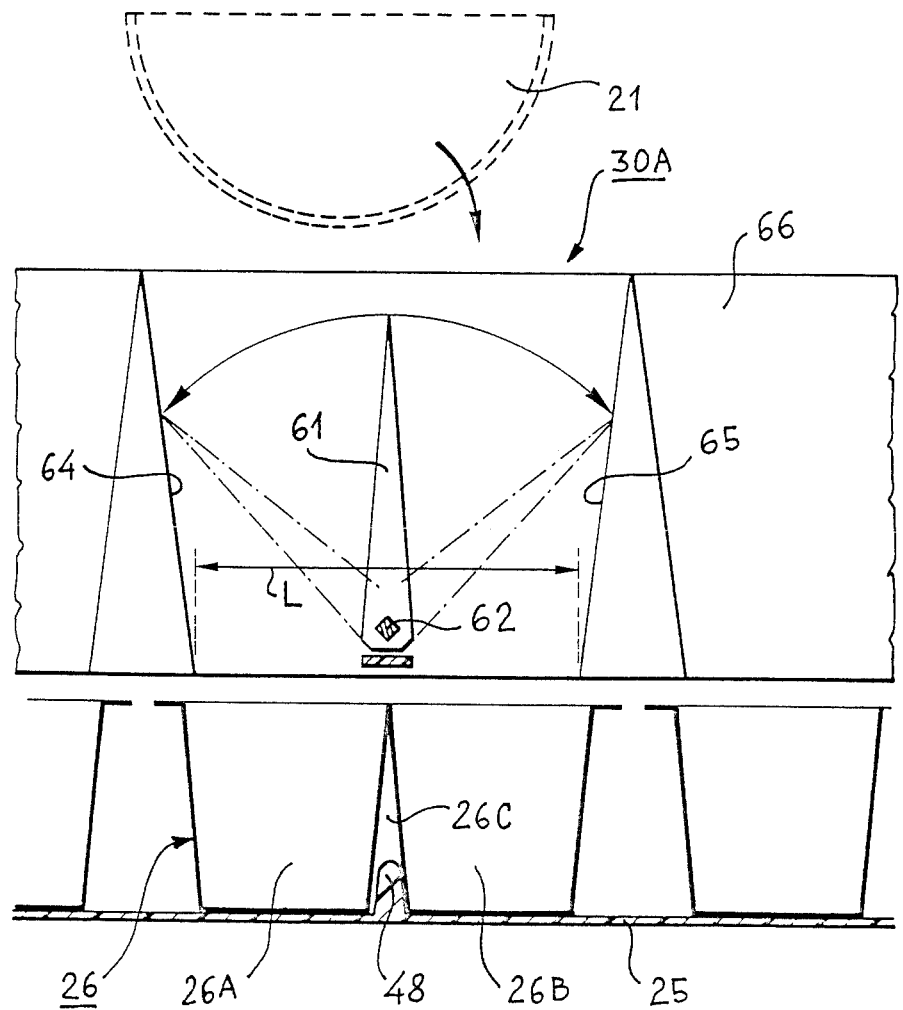
FIG. 6 is a diagrammatic elevation view of a variant embodiment of the selector device.
Figure 7:
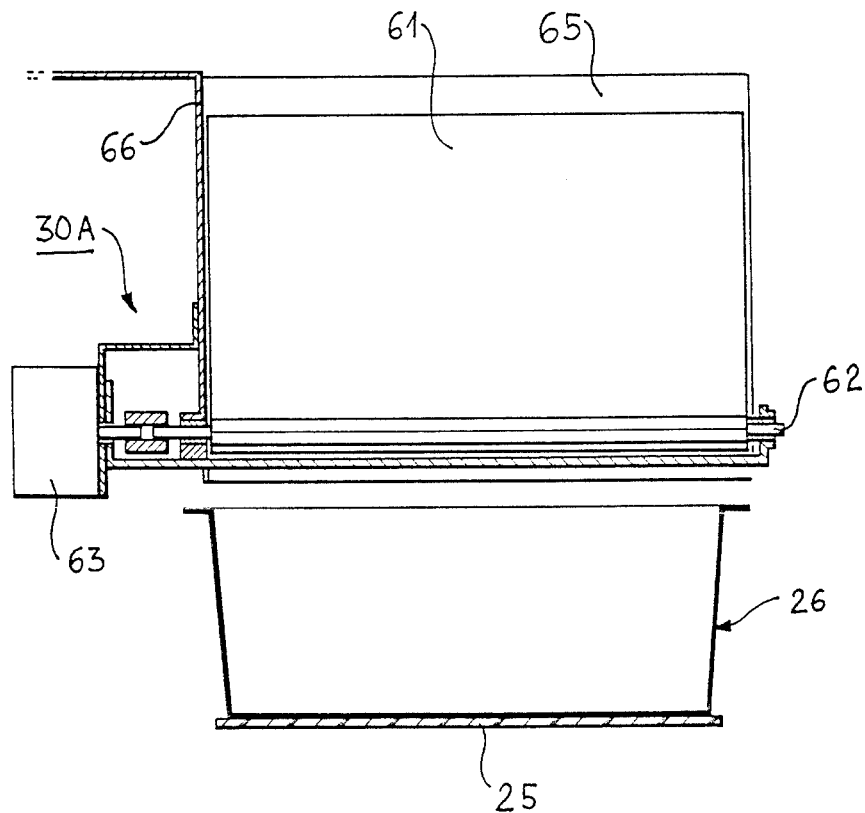
FIG. 7 is a profile view of the FIG. 6 selector device.

FIGS. 6 and 7 show a variant 30A of the selector device, in which the hoppers are replaced by a plurality of rectangular sheets 61 each provided with a shaft 62 rotated by a motor 63.

The stroke of the sheet 61 is limited by two plane sheets 64 and 65 which are substantially vertical and at a distance L apart, where L is equal to the width of a box as measured in the belt displacement direction.

The sheets 64 and 65 are fixed to a sheet 66 which is common to all of them and perpendicular thereto.

Depending on whether the sheet 61 is pressing against the sheet 64 or the sheet 65, an article is directed into one or other of the two compartments of a box.

The above-described installation is controlled by means of a programmed computer which actuates the various motors and actuators in accordance with a program for making up orders.

The operator sees the name or the number of the fist article to be selected from the stock appear on the screen, e.g. article A.

The operator extracts the indicated number and inserts them one-by-one into an opening 17 after identifying each of them by passing them in front of the reader 19.

Once an article as fallen into the chute 18, the flap 32 is closed so that article insertion takes place at a rate which is controlled by the machine.

The first article A remains in the chute until an empty bucket 21 arrives.

At this moment the chute is opened and the article falls into the bucket.

The chute then recloses and its flap opens so that a second article A can then be inserted through the opening 17 by the operator.

When the bucket containing article A arrives in coincidence with the first box that is to receive said article, the bucket pivots and the object falls into one of the compartments of said box, depending on the position of the selector 30. Once a box has been loaded onto the belt, it is associated with a given order (or prescription) and the various buckets open successively over the box in order to ensure that the order is completely satisfied before the box arrives at the unloading station.

A printer (not shown) makes out labels for identifying the boxes and these labels are automatically applied to each box.

The boxes may optionally be fitted with lids, in which case each box is presented in the open position at the loading station and the lid is automatically closed prior to the box arriving at the unloading station.

By way of practical example, using an installation having three operators working simultaneously, it is possible in a period of 60 minutes to make up 100 orders each having an average of 10 articles selected from 600 articles.

To this end, a carousel comprises 20 rows of horizontal troughs each having 10 bins.

The buckets 21 move at a speed of 2.5 buckets per second and the belt 25 moves at a speed of 0.36 km/minute.

The loading and unloading of the boxes is performed by automatic stations which are the subject of other patent applications.

We claim:

1. An installation for making up batches of articles, the installation comprising:

at least one work station for one operator, said station including a storage member for storing said articles species-by-species, said articles each being provided with automatically readable identification means, said station also including a reader for automatically reading the said identification means, an opening, a chute beneath said opening and a flap selectively closing off said opening to said chute, an article being placeable in said chute through said opening;

an endless chain of buckets disposed in such a manner that the buckets pass beneath the chutes, each of said buckets being provided with a controllable pivoting device to tip said buckets in order to cause an article contained therein to fall beneath the chain of buckets;

a moving belt disposed beneath the buckets, said belt cooperating with an inlet station for supplying said belt with empty boxes for receiving articles dropped from said buckets in order to make up batches of articles, and with an outlet station from which loaded boxes are removed; and a controlling computer which controls the opening and closing of said flaps and of said chutes and also the pivoting of the buckets in accordance with a program which is established depending on the batches to be made up.

2. An installation according to claim 1, further including a member for labelling the boxes after they have received their batches.

3. An installation according to claim 1, wherein each work station includes a display screen in communication with the computer in order to display, in particular, instructions for making up batches.

4. An installation according to claim 1, wherein each of the boxes has two compartments, and said installation further including a selector device placed between the chain of buckets and the belt and operatively movable between two positions in order to direct falling articles to one or other of said compartments.

5. An installation according to claim 4, wherein said selector device comprises a plurality of hoppers which are displaceable together in translation.

6. An installation according to claim 4, wherein said selector device comprises a plurality of pivoting flaps capable of being individually actuated.

7. An installation according to claim 1, wherein the device for pivoting the buckets comprises a plurality of racks movable in translation and engaging respective gear wheels fixed to each of said buckets.

8. An installation according to claim 1, wherein the moving belt includes catches for holding the boxes in position at a predetermined pitch or spacing.

* * * * *